United States Patent [19]
Sato

[11] Patent Number: 5,964,071
[45] Date of Patent: Oct. 12, 1999

[54] FRAME MATERIAL FOR WALL

[75] Inventor: Takao Sato, Hiroshima, Japan

[73] Assignee: Sato Katako Seisakusho Co., Ltd., Japan

[21] Appl. No.: 08/967,363

[22] Filed: Nov. 7, 1997

[30]     Foreign Application Priority Data

Feb. 14, 1997 [JP] Japan .................................. 9-030007

[51] Int. Cl.⁶ .................................................. E04C 2/38
[52] U.S. Cl. ....................... 52/656.1; 52/653.1; 52/653.2; 52/655.1; 52/41.1; 52/690; 52/317; 52/667; 403/316; 403/317
[58] Field of Search ............................... 52/656.1, 653.1, 52/653.2, 655.1, 41.1, 690, 317, 667; 403/315, 316, 317, 318

[56]                  References Cited

U.S. PATENT DOCUMENTS

| | | | |
|---|---|---|---|
| 236,755 | 1/1881 | Banks | 52/656.1 |
| 872,058 | 11/1907 | Duffy | 52/656.1 |
| 1,343,785 | 6/1920 | Murphy . | |
| 1,721,950 | 7/1929 | Gifford | 52/215 X |
| 2,097,484 | 11/1937 | Winslow | 52/656.1 |
| 3,196,994 | 7/1965 | Piget | 52/655.1 |
| 4,136,496 | 1/1979 | Molyneux | 52/656.1 |
| 4,250,679 | 2/1981 | Burg | 52/653.2 |
| 5,274,973 | 1/1994 | Liang | 52/243 |
| 5,287,664 | 2/1994 | Schiller et al. | 52/220.1 |
| 5,479,747 | 1/1996 | Wu | 52/656.1 |
| 5,483,777 | 1/1996 | Menchetti et al. | 52/481.1 |
| 5,588,274 | 12/1996 | Lange | 52/656.1 |
| 5,647,175 | 7/1997 | Smyth | 52/656.1 |
| 5,706,622 | 1/1998 | Lange | 52/653.1 |
| 5,797,233 | 8/1998 | Hascall | 52/653.1 |
| 5,855,100 | 1/1999 | Hsueh | 52/656.1 |

*Primary Examiner*—Carl D. Friedman
*Assistant Examiner*—Jennifer I. Thissell
*Attorney, Agent, or Firm*—Lorusso & Loud

[57]                  ABSTRACT

A frame material for a wall of a building, including a metal beam, and a tubular rectangular metal stud having opposite sides each provided with a window through which the beam is capable of being inserted and in which the beam is received such that the lateral movement is prevented. One of the windows has a stopper member which is displaceable between close and open positions and which extends from one side to the other side of the window. The stopper member in the closed state prevents the beam received in the windows to move vertically.

7 Claims, 5 Drawing Sheets

FRAME MATERIAL FOR WALL

BACKGROUND OF THE INVENTION

This invention relates generally to a metal frame material for walls of a building to which wall materials such as panels or laths are attached by fixing means such as screws.

One known metal frame material is shown in FIG. 6. The frame material includes a steel stud 1' having a rectangular cross section. The stud is formed from a single, axially extending rectangular steel plate having opposite longitudinal edges which are joined to form a longitudinally extending joined portion 2'. The plate is bent to have the rectangular cross section such that the joined portion 2' is located at a middle portion of one of the four side wall. In use, a plurality of such studs 1' are placed upright between a pair of horizontally disposed upper and lower supports secured to a ceiling slab and a floor, respectively.

The conventional metal frame material has a drawback because the frame structure thus constructed cannot withstand a strong force applied in the lateral direction along which the studs are arrayed, especially when the studs are long. Therefore, the known metal frame material is ill-suited for the construction of tall walls. Further, when panels or boards are attached to the frame structure with screws, the wall is apt to swing to hinder the screwing works.

SUMMARY OF THE INVENTION

It is, therefore, an object of the present invention to provide a frame material which can form a firm frame structure for walls capable of withstanding lateral forces.

Another object of the present invention is to provide a frame material of the above-mentioned type, which can construct a frame in a simple and efficient manner.

In accomplishing the foregoing object, there is provided in accordance with the present invention a frame material for a wall of a building, which includes a longitudinally extending metal beam having a pair of spaced apart, longitudinally extending side walls each having a top edge and a bottom edge, wherein the width of the metal beam is equal to the distance between the outside surfaces of the side walls; and a tubular metal stud having a rectangular cross-section and a pair of opposing first and second wall members and a pair of opposing third and fourth wall members located between the first and second wall members.

Each of the first and second wall members is provided with a window having a top end, a bottom end, opposite first and second intermediate side ends spaced apart from each other a distance greater than the width of the beam and opposite first and second lower side ends between which the beam is receivable with the beam being oriented in the direction normal to the first and second wall members and with the bottom edge of each of the side walls of the beam being engaged by the bottom end of each of the windows.

Each of the first and second lower side ends of the window of the first wall member has a protrusion so that the outer surfaces of the side walls of the beam are closely fitted between the protrusions, when the beam is received between the first and second lower side ends.

The first intermediate side end of the window of the first wall member has a stopper member which is displaceable between close and open positions and which extends from the first intermediate side end to a portion adjacent the corresponding second intermediate side end.

The stopper member has an upper end defining a space between the upper end and the top end of the corresponding window when the stopper member is in the close position and a lower end positionable adjacent the top edges of the beam when the beam is received between the first and second lower side ends of the window of the first wall member.

The stopper member permits the insertion of the beam through the windows when displaced to the open position.

BRIEF DESCRIPTION OF THE DRAWINGS

Other objects, features and advantages of the present invention will become apparent from the detailed description of the preferred embodiments of the invention which follows, when considered in light of the accompanying drawings, in which.

DETAILED DESCRIPTION OF THE PREFERRED EMBODIMENTS OF THE INVENTION

Figure 1:
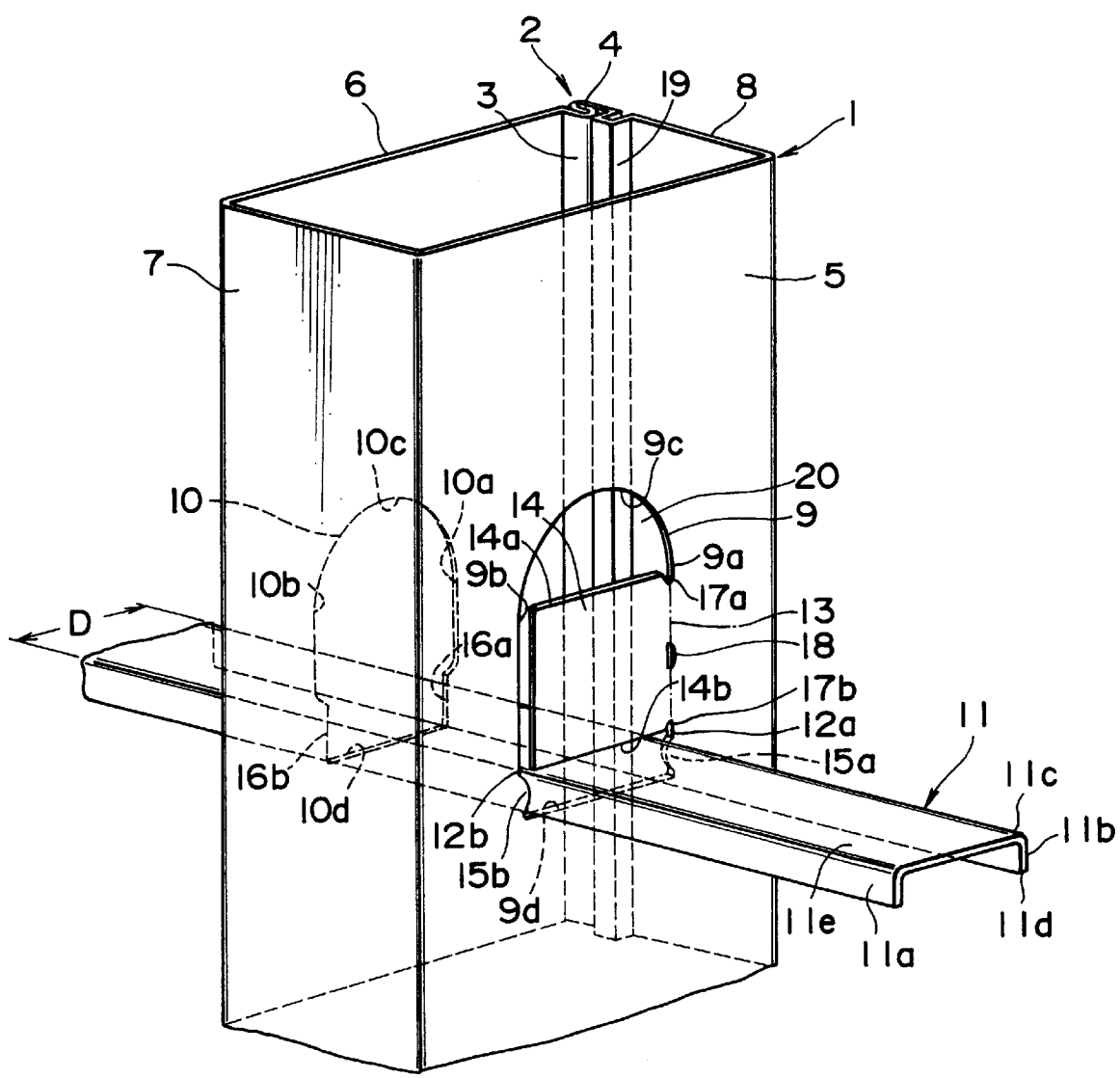
FIG. 1 is a fragmentary perspective view schematically illustrating a frame material including a stud and a beam in an assembled state.
Figure 2:
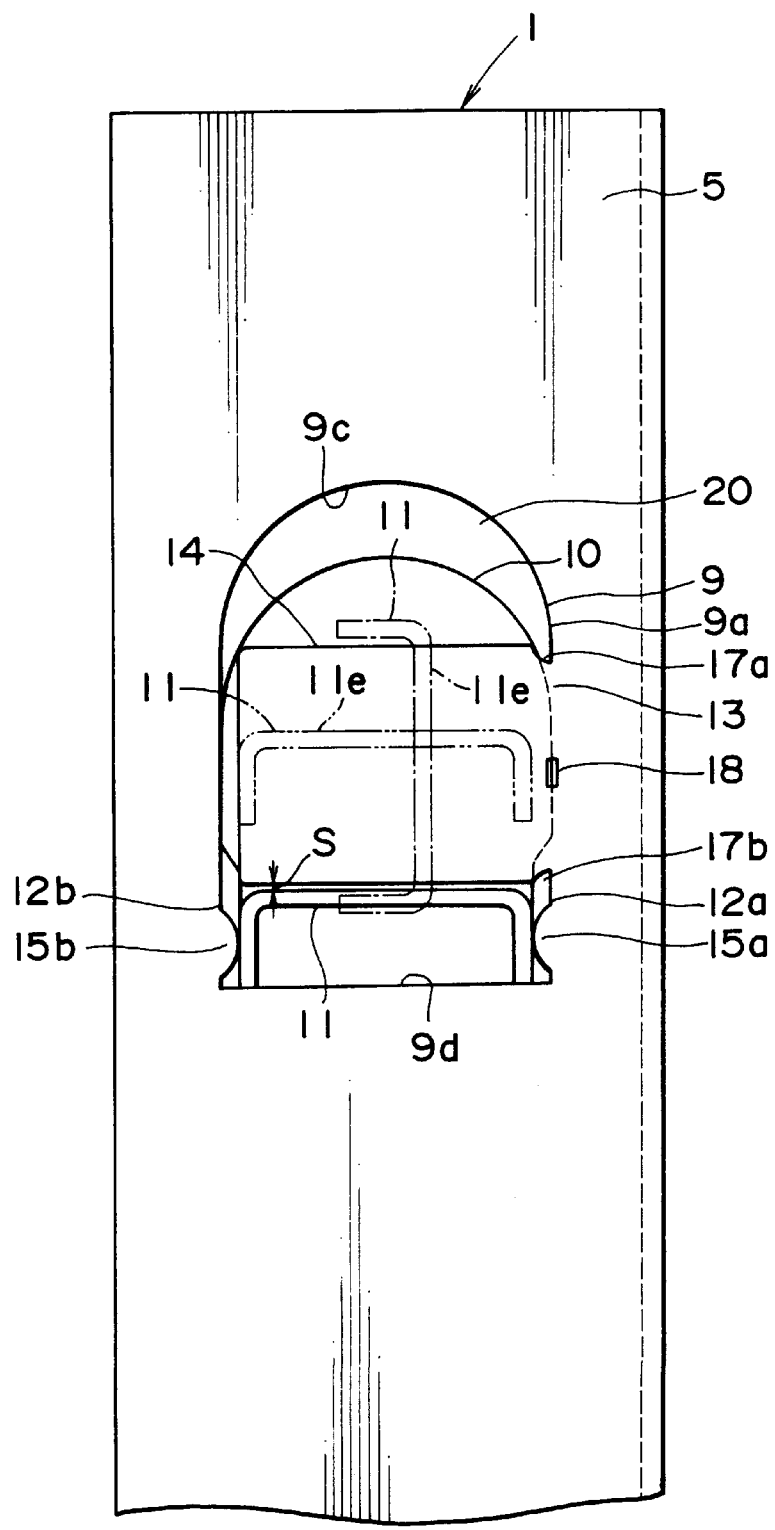
FIG. 2 is an elevational view of FIG. 1.

Referring now to FIGS. 1 and 2, a frame material for a wall of a building according to the present invention includes a combination of at least one tubular metal stud 1 (generally a plurality of studs) and a longitudinally extending metal beam 11. Any metal such as iron, steel or aluminum may be used for the stud 1 and the beam 11.

The beam 11 has a pair of spaced apart, longitudinally extending side walls 11a and 11b each having a top edge 11c and a bottom edge 11d. The distance between the outside surfaces of the side walls 11a and 11b represents the width D of the metal beam 11. In the illustrated embodiment, the metal beam 11 has an inverted U-shaped cross section and is composed of a longitudinally extending flat base wall 11e to which the side walls 11a and 11b are integrally connected at opposite longitudinal side edges thereof. However, any structure such as of an H-shaped, U-shaped or rectangular (tubular) cross section may be used for the purpose of the present invention.

The tubular metal stud 1 has a rectangular cross section and is constituted of a pair of opposing first and second wall members 5 and 6 and a pair of opposing third and fourth wall members 7 and 8 located between the first and second wall members 5 and 6. The stud 1 is preferably formed from a single plate and is prepared by bending, pressing and other suitable processing.

The first wall member 5 is provided with a window 9 having a top end 9c, a bottom end 9d, opposite first and second intermediate side ends 9a and 9b spaced apart from each other a distance greater than the width D of the beam 11 and opposite first and second lower side ends 12a and 12b between which the beam 11 is receivable with the beam 11 being oriented in the direction normal to the first and second wall members 5 and 6 and with the bottom edge 11d of each of the side walls 11b of the beam 11 being engaged by the bottom end 9d of the window 9. Similarly, the second wall member 6 is provided with a window 10 having a top end 10c, a bottom end 10d, opposite first and second intermediate side ends 10a and 10b spaced apart from each other a distance greater than the width D of the beam 11 and opposite first and second lower side ends 16a and 16b between which the beam 11 is receivable with the beam 11 being oriented in the direction normal to the first and second wall members 5 and 6 and with the bottom edge 11d of each of the side walls 11b of the beam 11 being engaged by the bottom end 10d of the window 10.

Each of the first and second lower side ends 12a and 12b of the window 9 of the first wall member 5 has a protrusion 15a, 15b so that the outer surfaces of the side walls 11a and 11b of the beam are closely fitted between the protrusions 15a and 15b, when the beam 11 is received between the first and second lower side ends 12a and 12b.

The first intermediate side end 9a of the window 9 of the first wall member 5 has a stopper member 14 which is displaceable between close and open positions (close position in FIG. 1) and which extends from the first intermediate side end 9a to a portion adjacent the corresponding second intermediate side end 9b. The stopper member 14 has an upper end 14a defining a space 20 between the upper end 14a and the top end 9c of the window 9 when the stopper member 14 is in the close position and a lower end 14b positionable adjacent the top edges 11c of the beam 11, preferably with a small gap S as best seen in FIG. 2 being defined therebetween for reasons of smooth closing of the stopper member 14, when the beam 11 is received between the first and second lower side ends 12a and 12b of the window 9 of the first wall member 5. The gap S should not be so large as to permit the beam 11 received in the bottom of the window 9 from being disengaged therefrom.

The stopper member 14 permits the beam 11 to pass through the windows 9 and 10 when displaced to the open position. The stopper member 14 in the illustrated embodiment is bendable along a bending line 13 coinciding with the first intermediate side end 9a of the window 9 and resumes the open position when bent at an angle of 90 degrees or more. To facilitate the bending operation, the upper and lower slits or cuts 17a and 17b and one or more intermediate slits 18 are formed along the bending line 13.

Figure 4:
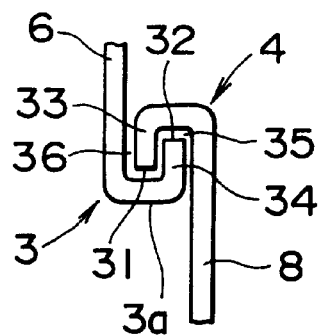
FIG. 4 is an enlarged, fragmentary, perspective view of the stud of FIG. 1.
Figure 5:
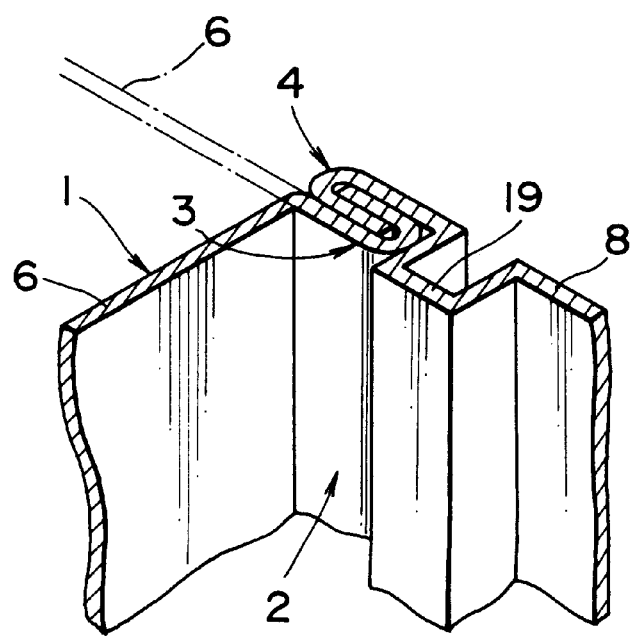
FIG. 5 is a plan view explanatory of the fabrication of the stud of FIG. 4.
Figure 6:
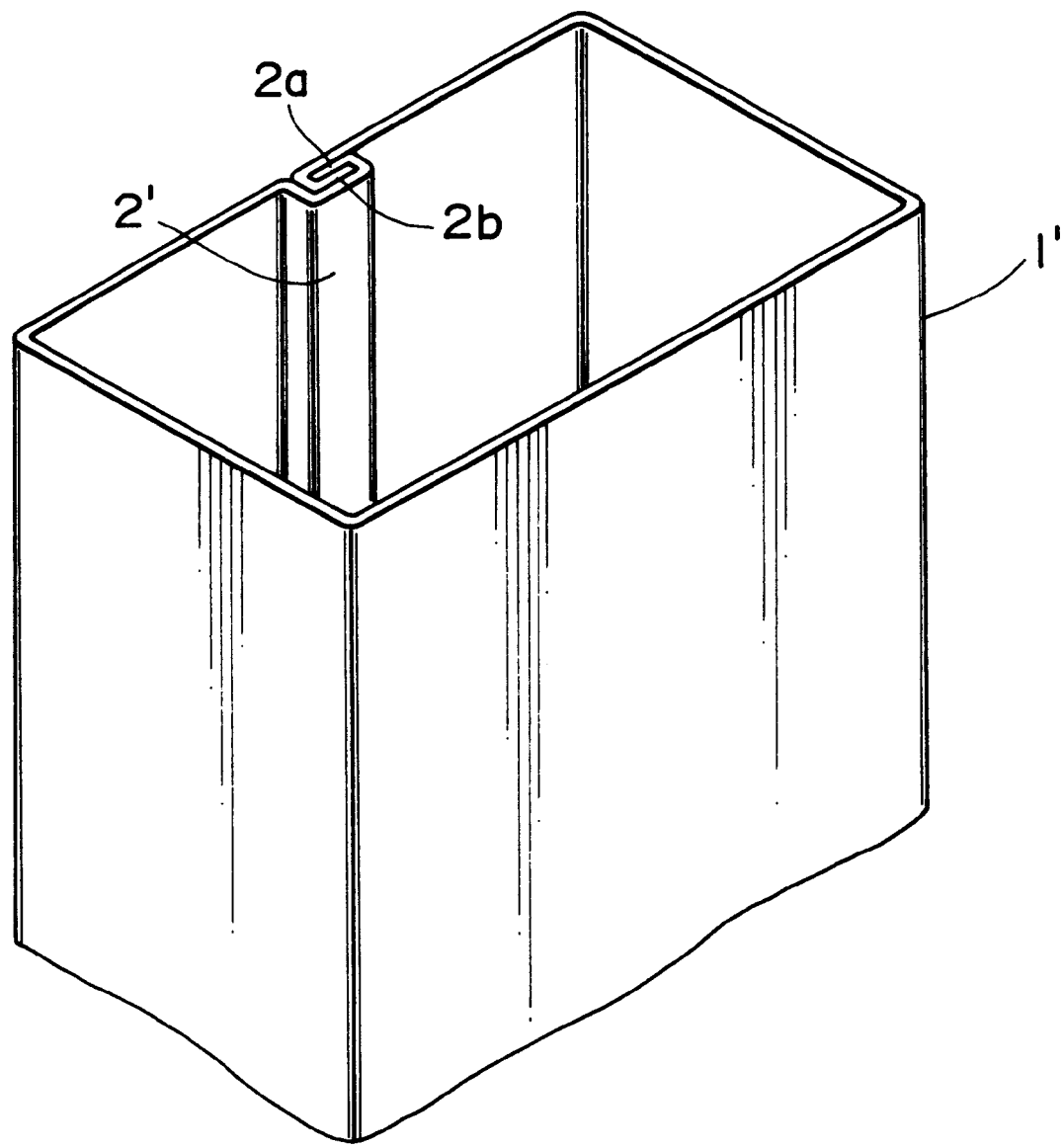
FIG. 6 is a fragmentary perspective view schematically illustrating a conventional stud.

The stud 1 is preferably formed from a single, longitudinally extending rectangular plate having opposite longitudinal edges. FIGS. 4 and 5 depict the construction of a connecting portion 2 of the opposite longitudinal edges 31 and 32. As shown in FIG. 4, an end portion 33, 34 adjacent each of the opposite longitudinal edges 31, 32 is longitudinally folded to form a J-shaped end 4, 3 and to form a longitudinally extending groove 35, 36 inside the J-shaped end 4, 3. The folded end portions 33 and 34 are fitted into respective grooves 36 and 35 and pressed so that the opposite longitudinal edges 31 and 32 are joined to form a longitudinally extending joined portion 2. The plate is bent to have the rectangular cross section such that the joined portion 2 is located at the corner of the fourth wall member 8 and the second wall member 6 as shown in FIG. 5.

The fourth wall member 8 is preferably bent to form an inwardly depressed, U-shaped, longitudinally extending rib 19 as shown in FIG. 5 such that the rib 19 is in contact with an outer surface 3a (FIG. 4) of the J-shaped end 3 of the second wall member 6 to prevent the disengagement of the folded end portions 33 and 34 from respective grooves 36 and 35.

Figure 3:
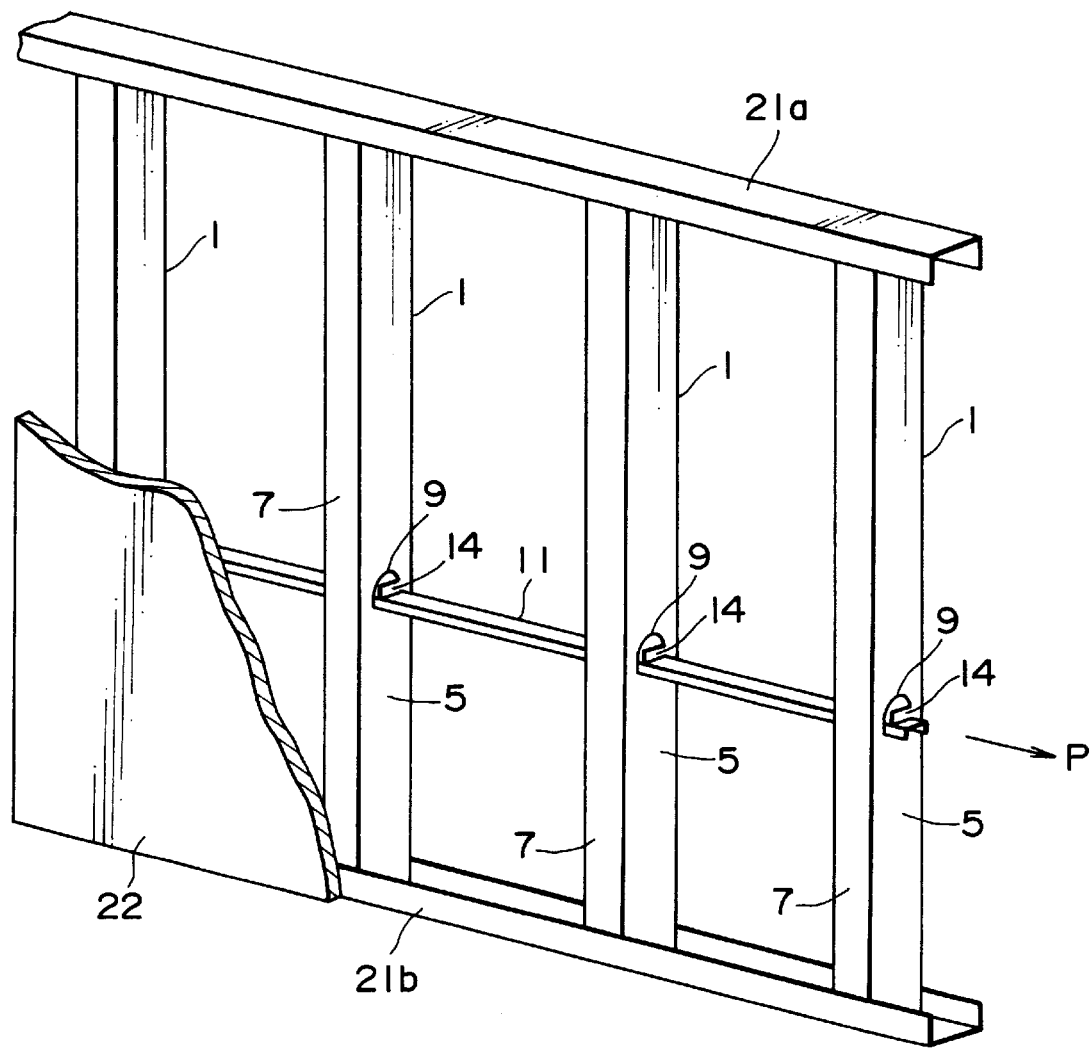
FIG. 3 is a perspective view, cut away in part, schematically illustrating a wall structure using the frame material of FIG. 1.

In constructing a frame structure using the above frame material, a pair of upper and lower supports (runners) 21a and 21b each having a U-shaped, rectangular groove are fixed to a sealing and a floor such that the grooves face to each other. A plurality of studs 1 having the above described structure are then fitted between the upper and lower supports 21a and 21b and positioned with a suitable space being defined between each adjacent studs 1, so that the studs 1 are supported upright between the upper and lower supports 21a and 21b with the third and fourth wall members 7 and 8 of each stud 1 being oriented in the direction perpendicular to the direction along which the supports 21a and 21b extend. In this case, it is preferred that the first wall member 5 having the window 9 provided with the stopper member 14 of each of the studs 1 be oriented in the same direction (P in FIG. 3).

The beam 11 is then inserted through the windows 10 and 9 of each of the studs 1 in the direction P, with the base wall 11e of the beam 11 being preferably oriented vertically (as shown by the one dotted line in FIG. 2) so that each of the stopper member 14 is pushed by the beam 11 and displaced from the closed position to the open position. The beam 11 is then turned so that the base wall is oriented horizontally as shown by the two-dotted line in FIG. 2. The beam 11 is further moved downward and is closely fitted between the pair of protrusions 15a and 15b and between the protrusions 16a and 16b of each of the studs 1. Thus, the beam 11 is prevented from being displaced in the lateral direction. The opened stopper member 14 of each stud 1 is then manually closed so that the beam 11 is prevented from being displaced in the vertical direction. The prevention of the vertically movement is attained even when the stopper member 14 is not in the fully closed position. Therefore, the studs 1 are tightly interconnected by the beam 11.

If desired, each of the studs 1 may be provided with a plural pairs of windows 9 and 10 arranged in the longitudinal direction of the stud 1. In this case, the same plural number of the beams 11 are used to interconnect the studs 1, so that the resulting frame structure is very firm. The use of a plural number of the beams 11 is effective when a tall wall is constructed.

A wall material such as a board 22 is then attached by, for example, screws to the third wall members 7 of the studs 1. Since the frame structure is firm and does not swing, the board attaching work can be smoothly performed.

In the above assembling procedures, the stopper member 14 is opened by pushing with the beam 11. It is, however, without saying that the stopper member 14 may be manually opened before the insertion of the beam 11 through the windows 9 and 10. In this case, the first wall members of the studs 1 need not be oriented in the same direction. In the above-described construction, the U-shaped beam 11 is received in the bottom of the window with the base wall lie being oriented upward. If desired, however, the base wall 11e may be oriented downward for engagement with the bottom ends 9d and 10d of the windows 9 and 10.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A frame material for a wall of a building, comprising:
   a longitudinally extending metal beam having a pair of spaced apart, longitudinally extending side walls each having a top edge and a bottom edge and an outside surface wherein the width of said metal beam is equal to the distance between the outside surfaces of said side walls; and a tubular metal stud having a rectangular cross-section and a pair of opposing first and second wall members and a pair of opposing third and fourth wall members located between said first and second wall members, each of said first and second wall members being provided with a window having a top end, a bottom end, opposite first and second intermediate side ends spaced apart from each other a distance greater than the width of said beam and opposite first and second lower side ends between which said beam is received with said beam being oriented in the direction normal to the first and second wall members and with said bottom edge of each of said side walls of said beam being engaged by said bottom end of each of said windows, each of said first and second lower side ends of said window of said first wall member having a protrusion so that said outer surfaces of said side walls of said beam are closely fitted between said protrusions, when said beam is received between said first and second lower side ends, said first intermediate side end of said window of said first wall member having a stopper member which is displaceable between close and open positions and which extends from said first intermediate side end to a portion adjacent the corresponding second intermediate side end, said stopper member having an upper end defining a space between said upper end and said top end of the corresponding window of the first wall member when said stopper member is in said close position and a lower end positionable adjacent said top edges of said beam when said beam is received between said first and second lower side ends of said window of said first wall member, said stopper member permitting the insertion of said beam through said windows when displaced to said open position.

2. A frame material as claimed in claim 1, wherein said stopper member is bendable along a bending line coinciding with said first intermediate side end of said window of said first wall member and resumes said open position when bent at an angle of 90 degrees or more.

3. A frame material as claimed in claim 1, wherein said stopper member is provided with at least one slit along said bending line.

4. A frame material as claimed in claim 1, wherein said beam has a U-shaped cross section and a longitudinally extending flat bottom wall to which said side walls are integrally connected at opposite longitudinal side edges thereof.

5. A frame material as claimed in claim 1, wherein said stud is formed from a single, longitudinally extending rectangular plate having opposite longitudinal edges, wherein an end portion adjacent each of said opposite longitudinal edges is longitudinally folded into a J-like shape and to form a longitudinally extending groove, wherein said folded end portions are closely fitted into respective grooves so that said opposite longitudinal edges are joined to form a longitudinally extending joined portion, and wherein said plate is bent to have said rectangular cross-section such that said joined portion is located at one of the four corners.

6. A frame material as claimed in claim 5, wherein one of said first to fourth wall members located adjacent said joined portion is bent to form an inwardly depressed, U-shaped, longitudinally extending rib such that said rib is in contact with an outer surface of said J-shaped end of another one of said first to fourth wall members located adjacent said joined portion to prevent the disengagement of the folded end portions from respective grooves.

7. A frame material as claimed in claim 1, further comprising a pair of upper and lower supports for supporting said stud upright therebetween.

* * * * *